United States Patent Office

3,124,461
Patented Mar. 10, 1964

3,124,461
PROCESSING OF COTTONSEED
Wilmon W. Meinke and Raymond Reiser, Bryan, Tex., assignors to The Texas A & M Research Foundation, College Station, Tex., a corporation of Texas
No Drawing. Filed Apr. 24, 1961, Ser. No. 104,809
8 Claims. (Cl. 99—2)

This invention relates to the processing of cottonseed and, more specifically, to a practical and economic method of producing high-protein cottonseed meal or flour of reduced pigment content, particularly reduced gossypol content, said method employing dynamic gaseous classification as an essential step.

Cottonseed meal has long been recognized as a potential food or feed source because of its high-protein content. In many instances, its use has been precluded, however, by the presence of a toxic substance or substances, usually in the pigment glands, uncombined or free gossypol being generally recognized as the principal offender. For the past several decades extensive research has been carried out with the objective of devising methods and techniques for reducing the free gossypol content to acceptable levels, e.g., from unacceptable levels of as much as 1 to 2% or more to acceptable levels of as little as 0.1 to 0.2%, or less. As a result of such research, a number of processes have been developed. All of such processes suffer, however, from one or more shortcomings which heretofore have prevented or hindered the full exploitation of cottonseed as a source of protein.

For example, one prior-art technique involves treatment under controlled heat and moisture conditions to detoxify the free gossypol by binding it to other substituents of the cottonseed. This technique gives variable results and, in addition, has a number of undesirable side effects, including protein denaturation and reduced digestibility with an overall reduction in nutritive value.

Another technique involves the application of one or more chemicals with the accompanying problem of adulteration. Further, the removal of the chemical or chemical-gossypol complex is costly and not always successful.

Another technique involves the use of polar solvents to rupture the pigment glands and extract the gossypol along with the cottonseed oil. This technique gives rise to a number of operating problems and, in addition, results in contamination of the cottonseed oil with the pigments, thereby giving rise to oil-refining problems.

Still another technique involves liquid-medium separation techniques, e.g., separating intact pigment glands by means of complex mixtures such as a mixture of carbon tetrachloride and an oil, or by differential settling or centrifugal separation in a liquid medium of a specified density, or the like. Such liquid-medium techniques suffer from the disadvantages of being tied to special preparation techniques, of not readily lending themselves to low-cost, high-volume production techniques and/or necessarily involving the use of deleterious, hazardous and/or otherwise undesired liquids during the separation step. Further, they require a subsequent liquid removal step to achieve the desired product, whereas the materials to be separated may have already been substantially dry in the first instance.

These and other disadvantages of such prior art techniques, which are reflected in unsatisfactory quality, processing difficulties, added cost and/or the like, are well recognized by those skilled in this art and understandably explain the relatively-limited exploitation of world cottonseed production as a source of protein.

It is therefore an object of the present invention to devise a method of processing cottonseed which is free from the aforementioned shortcomings.

It is a more specific object of the present invention to provide a method for reducing the gossypol content of cottonseed without undue protein denaturation and/or reduction in nutritive value.

It is another specific object of the present invention to provide a method for producing cottonseed flour of reduced gossypol content which does not involve application of chemical adulterants and which does not result in contamination of extracted cottonseed oil with undesired pigments.

It is a still further object of the present invention to provide an economical and practical method for producing low-gossypol content cottonseed flour in a dynamic, non-liquid, separation medium, which method lends itself to low-cost, high-volume production techniques.

These and other objects of the present invention will become apparent as a detailed description of the present invention proceeds.

These objects are achieved by a process which, in a broad embodiment, comprises subjecting comminuted cottonseed containing unruptured pigment glands and having a total volatile and moisture content not substantially in excess of about 10% by weight and a cottonseed oil content not in excess of about 10% by weight, to a substantially dry, moving, non-deleterious gaseous medium, e.g., air, whereby a fraction rich in cottonseed meal or flour is preferentially separated from a fraction rich in unruptured pigment glands.

To prepare the cottonseed for the aforementioned preferential separation or gaseous classification step, which advantageously is carried out with the cottonseed particles, or a substantial portion thereof, below about 100 microns in size, e.g., about 5 to 50 microns, we also take advantage, in a particular embodiment, of a heretofore-unappreciated observation, i.e., the fact that cottonseed meal or flakes can be subjected, under controlled conditions, to considerable mechanical working or comminution without excessive rupture of the pigment glands. Thus, contrary to the suggestion of the prior art that comminution of deoiled cottonseed meal or flakes must be carried out in a liquid medium, e.g., slurry grinding in hexane, to avoid excessive gland rupture, cottonseed meal or flakes may be comminuted for our subsequent gaseous classification step without substantial rupture of the pigment glands by conventional mechanical crushing or grinding techniques, provided that the moisture and volatile content is maintained in the range of about 4 to 10% by weight, preferably about 5 to 8% by weight.

Fortunately, the comminution without gland rupture may be carried out on otherwise conventional equipment which is already available in many plants, such as non-shearing, seed-crushing rolls, attrition grinders, and/or the like. When employing conventional non-shearing rolls, the cottonseed is preferably, but not necesarily, comminuted in a single pass. In attrition grinders, particle size is reduced by impingement of the particles upon each other and/or upon the sides of the grinder itself.

In a particular embodiment, the comminution of the cottenseed is carried out in two steps. For example, the cottonseed kernels or meats, after adjustment of the moisture content to the aforementioned ranges, are initially comminuted or flaked, preferably flaked, in preparation for solvent extraction, by a single pass through conventional non-shear seed-crushing rolls. After solvent extraction, and desolventizing, the deoiled flakes or coarse meal, after again being adjusted to a total volatile and moisture content in the indicated range if necessary, are further comminuted to a particle size below about 100 microns, e.g., 5 to 50 microns, by the same or similar conventional mechanical techniques, e.g., by means of single pass, non-shear rolls, attrition grinders and/or the like.

With total moisture and volatile content within the indicated ranges, no substantial rupture of the pigment glands occurs during either of the comminution steps.

In a further detailed embodiment of the present invention, cottonseed kernels or meats essentially free of hulls (preferably less than 1 to 2% hulls) are adjusted, if necessary, to a moisture content in the range of about 4 to 10%, preferably 5 to 8%, by conventional low-temperature drying or moisture (usually water) addition techniques. The meats are then comminuted without excessive pigment gland rupture by a single pass through conventional seed-crushing rolls such as are already available in the industry from conventional suppliers, e.g., The French Oil Mill Machinery Company, Piqua, Ohio; The Bauer Bros. Co., Springfield, Ohio; Ross Machine & Mill Supply, Inc., Oklahoma City, Oklahoma, etc. Alternatively, the meats are comminuted without excessive gland rupture in an attrition grinder, such as a BEKA impact grinding mill, Bernhard Keller, Zurich, Switzerland; an attrition mill, Universal Attrition Company, Giddings, Texas, or the like.

The resulting comminuted particles are then deoiled by conventional solvent extraction techniques but employing a non-polar solvent which will not rupture the pigment glands, e.g., hexane, heptane, pentane, octane, iso-octane and similar aliphatic hydrocarbons; carbon tetrachloride, ethylene dichloride and similar chlorinated hydrocarbons; benzene, toluene and similar aromatic hydrocarbons; and the like, preferably at extraction temperatures in the range of about 30 to 70° C. The deoiled material is then desolventized to less than 10 percent solvent, preferably to a solvent level of less than 1.0 percent, optimally approaching zero percent by weight, by conventional techniques, e.g., steam stripping, air drying, or the like.

The deoiled cottonseed particles are then further comminuted without excessive gland rupture by passing them through the same or similar conventional seed-crushing rolls, attrition grinders or the like as were previously used for the initial comminuting step so as to reduce the particle size of at least a substantial proportion of the material, preferably substantially all of the material (except the unruptured pigment glands) to about 50 microns or less, e.g., 5 to 50 microns. While conventional seed-crushing rolls may produce flakes from the kernels or meats, particularly at the higher moisture and volatile content levels, they also produce the fine meal or flour desired for the gaseous classification step, once the cottonseed oil has been reduced or removed.

The resulting deoiled cottonseed meal containing unruptured pigment glands is then subjected to a moving gaseous stream of sufficient velocity whereby the meal or flour particles are preferentially and dynamically separated from the unruptured pigment glands. The particular gas velocity to be employed depends, in part, upon the characteristics of the gas itself, e.g., density, viscosity, and/or the like, and also on the size of the pigment glands (which normally range from about 100 to 400 microns) and flour particles, as well as on the configuration thereof. For any particular case, the gas velocity can be determined by routine experimentation well within the skill of the art in the light of the present disclosure.

In this connection, it should be noted that the positive separation is dynamically effected by the substantial difference in drag on the irregularly-shaped flour particles, as compared with the smooth, ovoid shape of the pigment glands, said drag difference being sufficient to overcome any contrary density differential between the flour particles and pigment glands. Another advantage of the gaseous classification system of the present invention arises from the fact that the positive separation is effected in a dynamic system which is not restricted to any particular density relationship between the medium employed for effecting the separation and the products being separated.

Any gaseous media which is substantially inert to, and otherwise not deleterious to, the pigment glands and other constituents of the cottonseed may be employed for the gaseous classification step. The gaseous media should, of course, be substantially dry (e.g., free of entrained moisture) so that the meal or flour particles will not become sticky, tacky, or the like. Examples of operable gases are air; oxygen; nitrogen; carbon dioxide; carbon monoxide; ozone; the rare gases such as argon, krypton, and xenon; helium; normally-gaseous, nonreactive (to cottonseed constituents) hydrocarbon gases such as methane, ethane, and propane; and the like. As a practical matter, because of its ready availability without cost, air is used almost exclusively in the present process, although the process is not necessarily limited thereto from an operative standpoint. As an example of the gas rates employed when utilizing air as the classifying medium, it was found that effective separation of a gland-rich fraction from a cottonseed meal or flour fraction was achieved in a 4-inch-diameter, vertical, cylindrical classifier when air was moved upward through the classifier at a rate of about 4.0 to 5.0 cubic feet per minute at 14.7 p.s.i.a and 70° F., preferably 4.2 to 4.4 cubic feet per minute. In practice, air rates are readily determinable in such equipment by simply commencing and increasing the air rate until a velocity is reached at which satisfactory separations are being effected.

While comminution in preparation for the gaseous classification step may be carried out in one step, it should be understood that gaseous classification of coarse meal containing only a small proportion of fine meal or flour is feasible, accompanied by simultaneous or periodic grinding of residual coarse particles as the fine particles are removed. Commercial equipment for such simultaneous regrinding of coarse particles is presently available.

In another embodiment of the present invention the gaseous-classified meal or flour of the present invention is further treated to reduce the free-gossypol content to still lower levels, e.g., well below 0.1%. In this embodiment the gaseous-classified flour may be subjected to a second solvent extraction, but this extraction is carried out with a polar solvent capable of extracting a substantial proportion of the residual glandular and extra glandular gossypol, in contrast to the non-polar solvent of the first solvent extraction. Optionally, the gaseous-classified flour may, alternatively or additionally, be subjected to moist heat to bind a substantial proportion of the remaining free gossypol and thereby detoxify it.

The second solvent extraction may be carried out using conventional techniques and employing such polar solvents as ethyl ether and dioxane; various alcohols, such as isopropanol, ethanol, methanol, propanol, and the like; various ketones, such as acetone, butanone, and the like; and solvents possessing more than one functional group (i.e., ether oxygen, ketone oxygen, ester oxygens and/or alcohol oxygen), such as Cellosolve, diacetone alcohol, ethyl acetate and the like.

Moist-heat treatment of the gaseous-classified flour, with or without the aforementioned second solvent extraction, may be carried out, for example, at elevated temperatures in the range of about 200 to 300° F., e.g., about 212° F., with the flour at elevated total moisture and volatile levels, i.e., about 10 percent or above, e.g., about 10 to 20 percent, the treatment continuing for a period of at least about 10 minutes, e.g., about ½ to 2 hours.

As a typical example, air-classified meal of the present invention is raised to a total moisture and volatile content of about 15 percent, and contacted with 250° F. air at about atmospheric pressure (resulting in a cooking temperature of about 212° F.) for a period sufficient to reduce the total moisture and volatile level to at least about 7 to 8 percent. Free gossypol content is thereby substantially reduced.

The present invention will be more clearly understood from the following specific examples thereof, wherein low-gossypol content cottonseed flours were successfully prepared by means of gaseous classification.

*Example 1*

Cottonseed kernels, essentially free of hulls and having a moisture content in the range of about 5 to 8%, were disintegrated in an attrition-type mill, wherein disintegration of the kernels was accomplished, without rupture of a significant portion of the pigment glands, by impacts between the cottonseed particles themselves and by impact of the particles with the walls of the mill. The resulting kernel fines, a substantial portion of which had a particle size in the range of about 5 to 50 microns, were subjected to extraction with hexane so as to reduce the cottonseed oil content to about 4–5 percent by weight. After solvent removal, the resultant cottonseed meal was subjected to classification, employing air at ambient conditions as the classifying medium.

Classification was carried out in a flask which was connected by an adaptor to seven one-foot sections of two-inch plastic tubing, which were connected in series and arranged horizontally. The end of the tube was covered with a porous fabric bag to recover fines from the exiting air. Air from a compressed-air line was introduced into the flask. Particles entrained in the air thus passed into the tube and settled out in the different sections thereof. After classification, free gossypol and protein values for samples collected from the component parts of the classifier system (flask, adaptor, sections of the plastic tube and fabric bag) were obtained and are as follows:

|  | Free Gossypol, Wt. percent | Protein, Wt. Percent |
|---|---|---|
| Cottonseed Meal Charge | 1.080 | 50.6 |
| First Section of Tube | 0.124 | 53.6 |
| Second Section of Tube | 0.120 | 56.6 |
| Third Section of Tube | 0.080 | 52.9 |
| Fourth Section of Tube | 0.092 | 61.5 |
| Final 3 Sections Plus Bag | 0.088 | 62.4 |

The above data demonstrate that free-gossypol values decrease as distance from the flask increases. Microscopic examination of the fines in the tube also showed that the number of intact pigment glands or gland fragments decreased as distance from the flask increased. Intact pigment glands, however, were readily visible in large numbers in both the original meal and the flask residue.

*Example 2*

Cottonseed kernels, essentially free of hulls and having a moisture and volatile content in the range of about 4 to 10%, were comminuted on 5-high rolls of the type employed in cottonseed processing plants. Three aliquots of the same cottonseed kernels were fed into the 5-high rolls such that each of the aliquots received a different degree of rolling; namely, one pass between two rolls; two passes between three rolls and four passes between five rolls. Each sample of the resulting rolled cottonseed kernels was then extracted with hexane at room temperature and desolventized by air drying.

Each of the resulting cottonseed meal samples was then subjected to air classification in a four-inch diameter, vertical, cylindrical classifier having adjacent the lower extremity a fine-wire mesh for supporting the cottonseed meal above an inverted-cone-shaped air inlet. Above the wire mesh was a four-foot straight section having a 90° L at the top. The exit extremity of the L was fitted with a fabric bag for collection of the meal fines.

Air was supplied beneath the fine-wire screen, passed through the cottonseed meal and carried fines, having a particle size of about 50 microns or less, up into the fabric bag. During classification of each sample, air was shut off after about 10–15 minutes, and fines were collected from the fabric bag. The residue on the screen was removed, further comminuted and returned to the air classifier for collection of a second fraction. Gossypol values were determined with the following results:

| No. of Passes Between Rolls | Free Gossypol, Wt. percent | | |
|---|---|---|---|
|  | Charge to Classifier | First Fraction | Second Fraction |
| 1 | 1.130 | 0.212 | 0.200 |
| 2 | 1.070 | 0.312 | 0.444 |
| 4 | 0.904 | 0.472 | 0.432 |

Data of this table indicate increased gland fragmentation as more mechanical work is done on the kernels, mechanical work being expressed as the number of passes between rolls. Microscopic examination of the fractions revealed the presence of gland pigments in the 2 and 4-pass air-classified fractions but essentially no gland fragments or intact glands in the air-classified fractions obtained from the one-pass meal.

*Example 3*

Cottonseed kernels, essentially free of hulls and having a total moisture and volatile content in the desired range, were comminuted on 5-high rolls and then extracted with hexane. After air drying to remove the solvent, the resulting comminuted material was subjected to air classification in the classifier described in Example 2. Periodically, the air supply was cut off and the residue cottonseed on the screen of the classifier was removed for further comminuting by means of mulling in a mortar with a pestle so as to fragment at least a portion of the cottonseed meal residue to a particle size of about 50 microns or less without rupturing the pigment glands.

This procedure was followed until six flour fractions, a gland-rich meal residue and a coarse-meal residue were obtained. The gland-meal residue (fraction 7 in the following table) was collected in the fabric bag by increasing the air flow of the classifier. The yield and free-gossypol contents of each fraction were determined with the following results:

| Fraction | Yield, Wt. Percent | Free Gossypol, Wt. Percent |
|---|---|---|
| 1 | 18.5 | 0.078 |
| 2 | 10.5 | 0.084 |
| 3 | 9.0 | 0.124 |
| 4 | 11.5 | 0.124 |
| 5 | 17.5 | 0.368 |
| 6 | 5.0 | 0.230 |
| 7 | 24.0 | 3.40 |
| 8 | 4.0 | 0.630 |

A composite sample of the first four fractions of the above table would contain less than 0.1 percent free gossypol and would comprise 49.5 percent of the starting hexane-extracted meal charged to the air classifier. A combination of the first six fractions would represent a yield of 72 percent and a free-gossypol content of approximately 0.18 percent as compared to a free-gossypol content in the initial hexane-extracted meal of 0.960 percent.

These data support the premise that mechanical work can be done on both the raw kernels and the hexane-extracted meal without causing excessive rupture of the pigment glands. Further, cottonseed flour of less than 0.10 percent free gossypol can be produced in yields of at least 50 percent.

Example 4

To demonstrate that the gossypol content of air-classified cottonseed flours can be reduced still further by a second extraction with a polar solvent, air-classified cottonseed flours prepared in the same general manner as described in Examples 2 and 3 were extracted with an 80% isopropanol aqueous solution. Gossypol contents were determined with the following results:

| Air Classified Flour | Gossypol Content, Wt. Percent | |
|---|---|---|
| | Free | Total |
| Unextracted | 0.060 | 0.165 |
| Extracted | 0.004 | 0.085 |
| Unextracted | 0.210 | 0.280 |
| Extracted | 0.007 | 0.090 |
| Unextracted | 0.070 | 0.253 |
| Extracted | 0.009 | 0.125 |
| Unextracted | 0.200 | 0.400 |
| Extracted | 0.012 | 0.173 |
| Unextracted | 0.120 | 0.335 |
| Extracted | 0.012 | 0.210 |
| Unextracted | 0.290 | 0.510 |
| Extracted | 0.013 | 0.225 |

It is apparent that both free and bound gossypol values may be reduced by this "second-extraction" procedure. Although not shown in the above table, protein values were increased by extraction of non-protein components.

Example 5

The twice-extracted, air-classified flours of Example 4 are moistened with water to a total moisture and volatile content of about 15 percent and then cooked at about 212° F. by contact with heated air for a period of about one hour. The free-gossypol values are thereby reduced still further, although the total gossypol values remain substantially unchanged.

Example 6

The moisture content of a series of samples of cottonseed meats, hereinafter referred to as samples A through F, was adjusted to obtain moisture levels ranging from 3.27% to 12.16%. Sample C was the original cottonseed kernel produced and received no drying or moisture addition. Samples A and B were dried in electric ovens at 60° C. until moisture content was reduced from 6.6 percent to indicated values. Samples D, E, and F were prepared by adding 12, 24, and 36 grams of water, respectively, to 500 grams of whole kernels and allowing to equilibrate at room temperatures for 4 hours. Gossypol and protein determinations on these samples were as follows:

| Sample No. | Moisture, percent | Gossypol | | | Protein, percent |
|---|---|---|---|---|---|
| | | Total, percent | Free, percent | Bound, percent | |
| A | 3.27 | 1.16 | 1.04 | 0.12 | 35.68 |
| B | 4.69 | 1.27 | 1.09 | 0.18 | 35.20 |
| C | 6.60 | 1.18 | 1.16 | 0.02 | 34.53 |
| D | 8.25 | 1.21 | 1.15 | 0.07 | 33.93 |
| E | 9.75 | 0.95 | 0.92 | 0.03 | 33.47 |
| F | 12.16 | 1.23 | 1.01 | 0.22 | 32.72 |

Each of the above samples was comminuted by a single pass between two non-shearing crushing rolls. Samples A and B with the lowest moisture content produced meals, whereas the other samples showed increased flake formation as the moisture content increased. Each of the samples was then extracted with hexane. Extraction was carried out at three different temperature levels, i.e., 35° C., 50° C. and 68° C. Ease of oil extraction, absence of fines and filtering speed were best with samples B, C and D. Inspections of the hexane extracted and desolventized cottonseed meals were as follows:

OIL EXTRACTED AT 35° C.

| Sample | Volatile matter, percent | Gossypol | | | Oil, percent | Protein, percent |
|---|---|---|---|---|---|---|
| | | Total, percent | Free, percent | Bound, percent | | |
| A | 6.29 | 1.940 | 1.690 | 0.250 | 2.07 | 52.25 |
| B | 8.49 | 1.900 | 1.560 | 0.350 | 3.88 | 49.66 |
| C | 7.48 | 1.900 | 1.260 | 0.640 | 3.47 | 52.06 |
| D | 8.25 | 1.760 | 1.500 | 0.260 | 5.17 | 52.14 |
| E | 8.09 | 1.820 | 1.640 | 0.180 | 4.88 | 50.46 |
| F | 8.57 | 1.800 | 1.380 | 0.420 | 4.31 | 52.18 |

OIL EXTRACTED AT 50° C.

| Sample | Volatile matter, percent | Gossypol | | | Oil, percent | Protein, percent |
|---|---|---|---|---|---|---|
| | | Total, percent | Free, percent | Bound, percent | | |
| B | 7.58 | 1.910 | 1.420 | 0.490 | 2.57 | 51.76 |
| C | 7.51 | 1.810 | 1.380 | 0.430 | 2.98 | 49.29 |
| D | 7.39 | 1.790 | 1.640 | 0.150 | 4.02 | 54.47 |
| E | 7.39 | 1.940 | 1.620 | 0.320 | 3.21 | 55.58 |
| F | 7.52 | 1.920 | 1.470 | 0.450 | 3.38 | 51.37 |

OIL EXTRACTED AT 68° C.

| Sample | Volatile matter, percent | Gossypol | | | Oil, percent | Protein, percent |
|---|---|---|---|---|---|---|
| | | Total, percent | Free, percent | Bound, percent | | |
| C | 6.37 | 1.690 | 1.260 | 0.430 | 6.24 | 53.48 |
| D | 7.10 | 1.930 | 1.700 | 0.230 | 2.97 | 56.44 |
| E | 7.10 | 1.760 | 1.470 | 0.290 | 2.98 | 55.95 |
| F | 7.09 | 1.940 | 1.460 | 0.480 | 3.40 | 56.07 |

The extracted cottonseed meal was then comminuted so that at least a portion thereof was reduced to a particle size in the range of 5 to 50 microns and subjected to air classification by means of the same apparatus and procedure employed in Example 2. The results were as follows:

OIL EXTRACTED FROM MEALS AT 35° C.

| Sample | Volatile Matter, percent | Gossypol | | | Oil, percent | Protein, percent |
|---|---|---|---|---|---|---|
| | | Total, percent | Free, percent | Bound, percent | | |
| A | | 0.170 | 0.160 | 0.010 | | |
| B | 5.43 | 0.250 | 0.195 | 0.055 | 4.00 | 58.16 |
| C | 5.91 | 0.225 | 0.200 | 0.025 | 3.53 | 56.81 |
| D | 6.16 | 0.245 | 0.185 | 0.060 | 5.28 | 54.47 |
| E | 6.43 | 0.205 | 0.105 | 0.100 | 4.96 | 52.74 |
| F | 6.47 | 0.340 | 0.210 | 0.130 | 4.43 | 55.78 |

OIL EXTRACTED FROM MEALS AT 50° C.

| Sample | Volatile Matter, percent | Gossypol | | | Oil, percent | Protein, percent |
|---|---|---|---|---|---|---|
| | | Total, percent | Free, percent | Bound, percent | | |
| B | 6.11 | 0.330 | 0.160 | 0.170 | 2.61 | 57.18 |
| C | 7.34 | 0.340 | 0.135 | 0.205 | 3.00 | 57.81 |
| D | 6.82 | 0.283 | 0.160 | 0.123 | 4.05 | 56.44 |
| E | 6.35 | 0.335 | 0.200 | 0.135 | 3.24 | 55.32 |
| F | 6.50 | 0.390 | 0.192 | 0.198 | 3.42 | 56.93 |

OIL EXTRACTED FROM MEALS AT 68° C.

| Sample | Volatile Matter, percent | Gossypol | | | Oil, percent | Protein, percent |
|---|---|---|---|---|---|---|
| | | Total, percent | Free, percent | Bound, percent | | |
| C | 5.85 | 0.425 | 0.135 | 0.290 | 6.28 | 54.22 |
| D | 7.16 | 0.368 | 0.095 | 0.273 | 2.97 | 59.64 |
| E | 7.05 | 0.285 | 0.100 | 0.185 | 2.98 | 60.14 |
| F | 6.43 | 0.450 | 0.120 | 0.330 | 3.42 | 56.93 |

From the above specific examples it is apparent that the objects of the present invention have been achieved. While the present invention has been described in connection with certain specific embodiments and these examples, it should be understood, of course, that the invention is not limited thereto. Alternative modifications of the present invention will be apparent from the above detailed description and specific examples to those skilled in the art, and such modifications are considered within the scope and spirit of the present invention.

When referring to total moisture and volatile content and gossypol content in the above description, the following standard procedures from "Official and Tentative Methods of the American Oil Chemists' Society," 2nd edition, 1946 (with additions and revisions to 1960), are contemplated:

Total moisture and volatile content—AOCS Official Method Ba 2–38, revised April 1954
Free gosspyol—AOCS Official Methods Ba 7–58
Total gossypol—AOCS Tentative Method Ba 8–55
Gossypol in oils—AOCS Tentative Method Ca 13–56

Bound or combined gossypol is computed by subtracting the free-gossypol value from the total-gossypol value, as above determined.

Having thus described the invention, what is claimed is:

1. A process for the preparation of cottonseed flour of reduced gossypol content which comprises subjecting comminuted cottonseed, at least a portion of which having a particle size in the range of about 5 to 50 microns, containing unruptured pigment glands and having a total volatile and moisture content not in excess of about 10% by weight and a cottonseed oil content not in excess of about 10% by weight, to a substantially-dry, moving, non-deleterious gaseous classifying medium having a velocity sufficient whereby a fraction rich in cottonseed meal is preferentially separated from a fraction rich in said unruptured pigment glands.

2. A process for the preparation of cottonseed meal of reduced gossypol content which comprises subjecting comminuted cottonseed, a substantial portion of which having a particle size in the range of about 5 to 50 microns, and containing unruptured pigment glands and having a total volatile and moisture content not in excess of about 10% by weight and a cottonseed oil content not in excess of about 10% by weight, to a moving air stream having a velocity sufficient whereby a fraction rich in cottonseed meal is preferentially separated from a fraction rich in said unruptured pigment glands; and solvent extracting said fraction rich in cottonseed meal with a polar solvent capable of extracting a substantial proportion of the residual glandular and extraglandular gossypol.

3. A process for the preparation of cottonseed meal of reduced gossypol content which comprises subjecting comminuted cottonseed, a substantial portion of which having a particle size in the range of about 5 to 50 microns, said comminuted cottonseed containing unruptured pigment glands and having a total volatile and moisture content not in excess of about 10% by weight and a cottonseed oil content not in excess of about 10% by weight, to substantially-dry moving air having a velocity sufficient whereby a fraction rich in cottonseed meal is preferentially separated from a fraction rich in said unruptured pigment glands; subjecting said fraction rich in cottonseed meal to elevated temperatures and at elevated total moisture and volatile levels for a period sufficient to bind free gossypol present in said fraction rich in cottonseed meal to other constituents of the meal and thereby detoxify the free gossypol.

4. A process for the treatment of dehulled cottonseed which comprises solvent extracting with a non-polar solvent whereby the cottonseed oil content is reduced to a level not in excess of about 10% by weight without substantial rupturing of the cottonseed pigment glands; comminuting the cottonseed at a total volatile and moisture content in the range of about 4 to 10% by weight in a substantially dry medium, whereby the cottonseed is fragmented so as to produce at least a portion having a particle size in the range of 5 to 50 microns without substantial rupturing of the pigment glands contained therein; and subjecting the fragmented and deoiled cottonseed in a substantially-dry state to a substantially dry, moving, non-deleterious gaseous classifying medium having a velocity sufficient whereby a fraction rich in cottonseed meal is preferentially separated from a fraction rich in said unruptured pigment glands.

5. A process for the preparation of cottonseed meal of reduced gossypol content which comprises flaking cottonseed meats; solvent extracting the resulting flakes with a non-polar solvent whereby the cottonseed oil content is reduced to a level not in excess of about 10% by weight without substantial rupturing of the cottonseed pigment glands; desolventizing the extracted flakes; comminuting the extracted flakes at a total volatile and moisture content in the range of about 4 to 10% by weight in a substantially-dry medium, whereby at least a portion of the cottonseed is fragmented to a particle size in the range of about 5 to 50 microns without substantial rupturing of the pigment glands contained therein; and subjecting at least said portion, at a volatile and moisture content not in excess of about 10% by weight, to moving air having a velocity sufficient whereby a fraction rich in cottonseed meal is preferentially separated from a fraction rich in unruptured pigment glands.

6. A process for the preparation of cottonseed meal of reduced gossypol content which comprises rolling cottonseed meats having a moisture content in the range of about 4 to 10% by weight, whereby at least a portion thereof is flaked; solvent extracting at least said portion with hexane, whereby the cottonseed oil content is reduced to a level not in excess of about 10% by weight without substantial rupturing of the cottonseed pigment glands; desolventizing the extracted flakes; comminuting the extracted flakes at a total volatile and moisture content in the range of about 4 to 10% by weight, whereby at least a portion of the extracted flakes is fragmented to a particle size in the range of about 5 to 50 microns without substantial rupturing of the pigment glands contained therein; and subjecting at least the fragmented portion, at a total volatile and moisture content not in excess of about 10% by weight, to moving air having a velocity sufficient whereby a fraction rich in cottonseed meal is preferentially separated from a fraction rich in unruptured pigment glands.

7. The process of claim 6 including the step of solvent extracting said fraction rich in cottonseed meal with a polar solvent capable of extracting a substantial proportion of the residual glandular and extraglandular gossypol.

8. The process of claim 6 including the step of subjecting said fraction rich in cottonseed meal to a moist-heat treatment for a period sufficient to bind at least a substantial portion of any free gossypol present therein to other constituents of the meal and thereby detoxify that portion of the free gossypol.

References Cited in the file of this patent

UNITED STATES PATENTS

| | | |
|---|---|---|
| 1,286,389 | Mullen | Dec. 3, 1918 |
| 2,743,817 | Musgrave et al. | May 1, 1956 |

OTHER REFERENCES

Bailey: Cottonseed, pp. 357–362, Interscience Pub. Inc., N.Y.C., 1948. (Copy in Sci. Lib.)